(12) United States Patent
Calvarese et al.

(10) Patent No.: US 8,737,934 B2
(45) Date of Patent: May 27, 2014

(54) SETTING SAR EXPOSURE LIMIT OF MOBILE DEVICES

(75) Inventors: Russell Calvarese, Stony Brook, NY (US); Robert Sandler, Melville, NY (US); Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 746 days.

(21) Appl. No.: 12/624,546

(22) Filed: Nov. 24, 2009

(65) Prior Publication Data

US 2011/0124363 A1 May 26, 2011

(51) Int. Cl.
*H04B 1/04* (2006.01)
*H04B 7/00* (2006.01)

(52) U.S. Cl.
USPC ....... 455/91; 455/114.1; 455/127.1; 455/522; 370/318; 370/342

(58) Field of Classification Search
USPC ............. 455/67.11, 67.13, 115.1, 127.1, 522, 455/114.1; 370/318, 335, 342
See application file for complete search history.

(56) References Cited

U.S. PATENT DOCUMENTS

| | | | | |
|---|---|---|---|---|
| 5,524,275 A * | 6/1996 | Lindell | .......................... | 455/117 |
| 6,005,853 A * | 12/1999 | Wang et al. | .................... | 370/332 |
| 6,134,423 A | 10/2000 | Wiedeman et al. | | |
| 6,725,270 B1 * | 4/2004 | Yu et al. | ......................... | 709/229 |
| 7,187,172 B2 * | 3/2007 | Bielmeier et al. | ............. | 324/314 |
| 7,340,225 B2 * | 3/2008 | Bielmeier et al. | ......... | 455/115.1 |
| 7,388,849 B2 * | 6/2008 | Kim et al. | ...................... | 370/329 |
| 7,622,921 B2 * | 11/2009 | Fontius et al. | ................. | 324/307 |
| 8,098,680 B2 * | 1/2012 | Chen et al. | ..................... | 370/447 |
| 2002/0167930 A1 * | 11/2002 | Pearl | .............................. | 370/345 |
| 2003/0228875 A1 * | 12/2003 | Alapuranen | ................... | 455/522 |
| 2004/0203762 A1 * | 10/2004 | Liu et al. | ....................... | 455/434 |
| 2005/0129045 A1 * | 6/2005 | Machulsky et al. | ........... | 370/428 |
| 2006/0233178 A1 * | 10/2006 | Lu et al. | .................... | 370/395.21 |
| 2008/0056177 A1 * | 3/2008 | Mori et al. | ..................... | 370/318 |
| 2008/0132264 A1 * | 6/2008 | Krishnamurthy et al. | .... | 455/522 |
| 2008/0144493 A1 * | 6/2008 | Yeh | ............................... | 370/230 |
| 2011/0148411 A1 * | 6/2011 | Bottomley et al. | ........... | 324/309 |

FOREIGN PATENT DOCUMENTS

| | | |
|---|---|---|
| EP | 1895714 A1 | 3/2008 |
| WO | 9503549 A1 | 2/1995 |
| WO | 2009023458 A2 | 2/2009 |

OTHER PUBLICATIONS

International Search Report and Written Opinion mailed on Jun. 9, 2011 for International Application No. PCT/US2010/055550.
European Search Report for Patent Application No. 13152416.7 mailed Apr. 2, 2013.

* cited by examiner

*Primary Examiner* — Simon Nguyen

(57) ABSTRACT

A programmable controller and software that monitors periods an RF transmitter is active and a output power level during those periods of activity. These two values are multiplied together and accumulated over time to provide a value for the RF emissions for some period. A limit is set for the RF emissions for any period and if the RF emissions exceeds (or is expected to exceed given the current rate) the set limit, the system limits the subsequent emissions to not exceed the set limit. This reduction in emissions rate come at the cost of a small performance reduction.

12 Claims, 4 Drawing Sheets

SAR PARAMETERS VERSUS DISTANCE FROM ACCESS POINT

RETRIES CAUSED BY COLLISIONS

SETTING SAR EXPOSURE LIMIT OF MOBILE DEVICES

FIELD OF THE INVENTION

The present invention relates to a portable communications device and more particularly to a means of limiting radio frequency energy exposure to users of such a device.

BACKGROUND ART

Specific absorption rate (SAR) is a measure of the rate at which radio frequency (RF) energy is absorbed by a body when exposed to a radio-frequency electromagnetic field. SAR testing insures RF emitting products don't exceed government set limits. Wide spread use of cell phones and 802.11 devices have made the public aware of SAR and concerns regarding radiation absorption. Devices that emit RF energy that are intended to be worn for long periods of time can cause additional concern to the public. This concern might reduce the public acceptance of an otherwise successful product.

During SAR regulatory testing, a manufacturer must specify to the government the usage cases for the product. As an example, a mobile 802.11 device will emit much more radiation when the device is at the fringe of the access point coverage area. This is due to an increase in transmission retry count and increase in peak power output of the mobile device. The net increase for this case can be on the order of 100 times. Another concern occurs when other RF traffic in the area degrades the RF link due to collisions. A manufacturer must specify these worst cases when the SAR testing takes place. Additional testing can be performed with typical cases but the results quickly become less conclusive and accepted by the public.

SUMMARY

The disclosed method and apparatus allow a portable communications device that might otherwise fail the SAR limits to pass by limiting a worst case absorption rate with little decrease in performance. An exemplary device can set its own SAR limit which may be less than the regulatory limit thus reducing a user's SAR concerns. This comes at a small cost in performance in the fringe and/or high traffic cases. The SAR limit may be set by the manufacturer, $3^{rd}$ party developer, business owner or even the end user. The device monitors and optionally displays its own emission rate over time to verify it is under the regulatory or set limit.

One use of the disclosed method and system is for use as a control to avoid a potential issue with a head worn device using the 802.11 protocol, but the concepts and performance could also apply to WWAN, RFID, Bluetooth, other RF technologies, fixed, handheld or worn devices.

The exemplary embodiment includes a programmable controller and software that monitors the periods an RF transmitter is active and a output power level during those periods of activity. These two values are multiplied together and accumulated over time to provide a value for the RF emissions for some period. A limit is set for the RF emissions for any period and if the RF emissions exceeds (or is expected to exceed given the current rate) the set limit, the system limits the subsequent emissions rate to not exceed the set limit. This reduction in emissions rate come at the cost of a small performance reduction.

These and other features are described in conjunction with the accompanying drawings.

DETAILED DESCRIPTION OF EXEMPLARY SYSTEM

It will be appreciated that embodiments of the invention described may include one or more conventional processors and unique stored program instructions that control the one or more processors to implement, in conjunction with certain non-processor circuits, the SAR monitoring and control functions.

Figure 1:
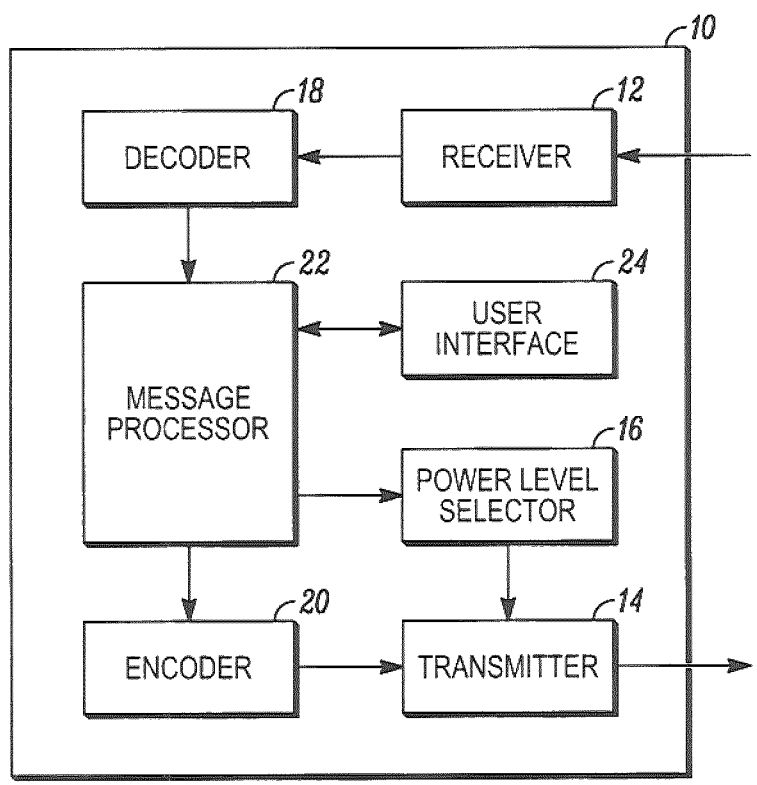
FIG. 1 is a schematic depiction of a portable communications device that includes a controller for implementing an exemplary system.

FIG. 1 depicts a representative portable communications device 10 and includes a radio frequency (rf) receiver 12, a radio frequency transmitter 14, a signal strength driver 16, a signal decoder 18 and a signal encoder 20 that interface with a controller or processor 22. Other non controller circuits include clock circuits, power source circuits, and user input devices or interfaces 24 for commanding operation of the device.

Some SAR functions described with respect to an exemplary method (FIG. 2) can be implemented by a state machine that has no stored program instructions, or in one or more application specific integrated circuits (ASICs), in which each function or some combinations of certain of the functions are implemented as custom logic. One of ordinary skill guided by the concepts and principles disclosed herein will also be readily capable of generating software instructions and programs for use with the exemplary hardware.

The system is used and has applicability to different wireless networks having one of more mobile nodes or devices communicating with one or more access points that are typically stationary but need not necessarily be so. One suitable wireless network conforms to IEEE standard 802.11x and is referred to generally as wi-fi.

One protocol for communications networks is a carrier sense multiple access with collision detection mechanism, know by the abbreviation CSMA/CD. A node on the network senses the medium and if the medium is busy due to another node transmitting, the sensing node defers its transmission to a later time when the medium is free. This protocol is effective when the medium is not heavily used. There is a chance however, that two nodes will sense an available medium and simultaneously transmit leading to a collision. A common way to address these collisions is for both nodes to back off a random amount (statistically likely to be different) and then retransmit.

While collision detection works well on a wired network, it is less useful on a wireless network. Implementing collision detection requires each node to both send and receive data packets at the same time. Also, in a wireless environment sensing of the medium may not be as reliable. The absence of packets at one location does not mean other nodes are not communicating with an access point. The sensing node just cannot sense the presence of these other packets on the medium. For such networks collision avoidance rather than collision detection is also used.

A node needing to transmit senses the media (if it has that capability) and if it is busy it defers. If the media is free (as sensed by the node) for a specified time then the node transmits. A receiving station (access point) checks the CRC portion (error check sum) of an incoming packet and sends an acknowledgement packet back to the sending node. If no acknowledgement is received by the sending node, that node retransmits until it gets an acknowledgment or transmission fails a specified number of times. This protocol gives the sending node leeway in how often it retransmits, referred to herein as the retry rate.

Figure 3:
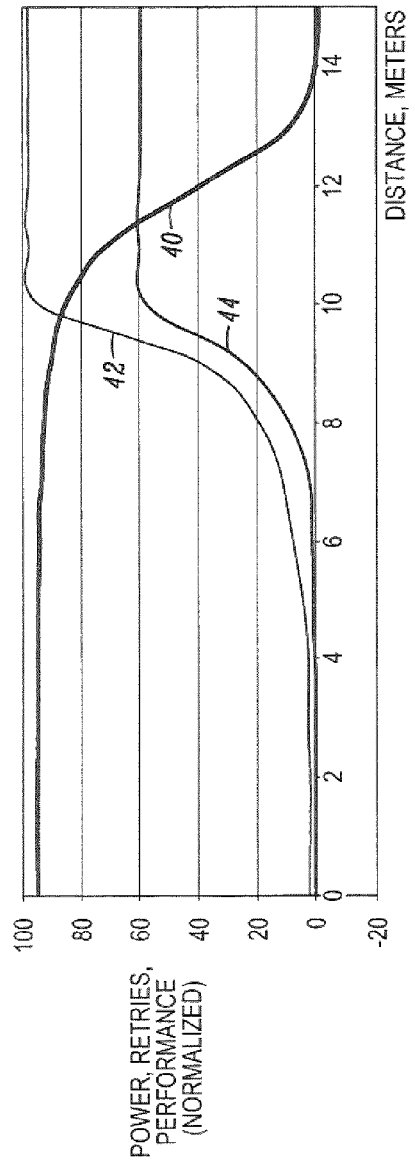
FIG. 3 shows normalized RF power and needed number of retries as a function of distance from an 802.11 access point without use of the disclosed system; The system is permitted to stay at the maximum peak power indefinitely and is also permitted a maximum retry count indefinitely.

FIG. 3 shows normalized RF power and needed number of retries as a function of distance from an access point for a mobile device using the 802.11 communications protocol. A curve 40 indicates performance as a function of distance and drops off as the distance increases. The curve 42 is an indication of power output and the curve 44 is a depiction of the number of retries. The scale to the left is not in units of power or iterations but instead is relative to a maximum power output and number or retries. At a distance of about 8 meters the number of retries and the power output needed rises to achieve even a lowered performance.

Figure 4:
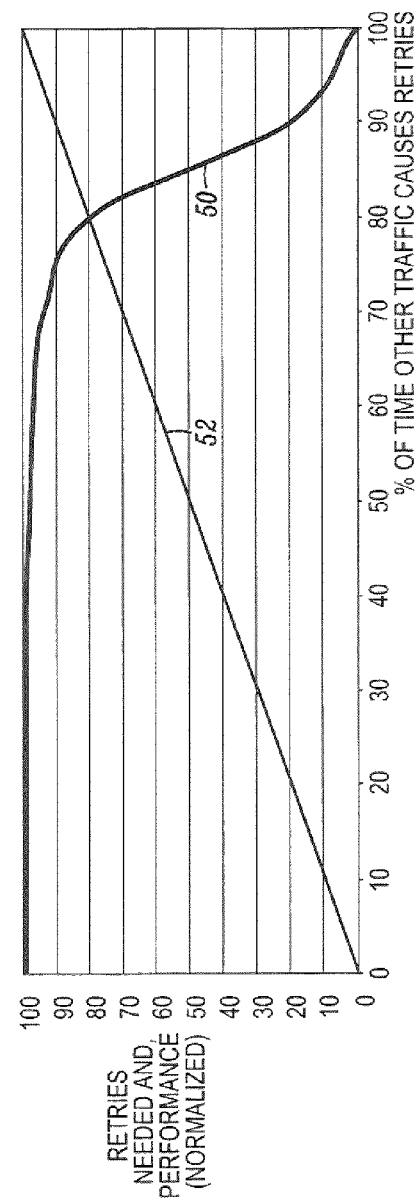
FIG. 4 shows retry count as a function of RF traffic for a system that is permitted a maximum number of retries.

FIG. 4 shows a performance curve 50 (normalized) as a function of the percentage of time other traffic on the network leads to retries. If the number of retries denoted by the curve 52 is linearly related to the percentage of time retries are needed, performance begins to noticeably decline at about 70%.

Figure 5:
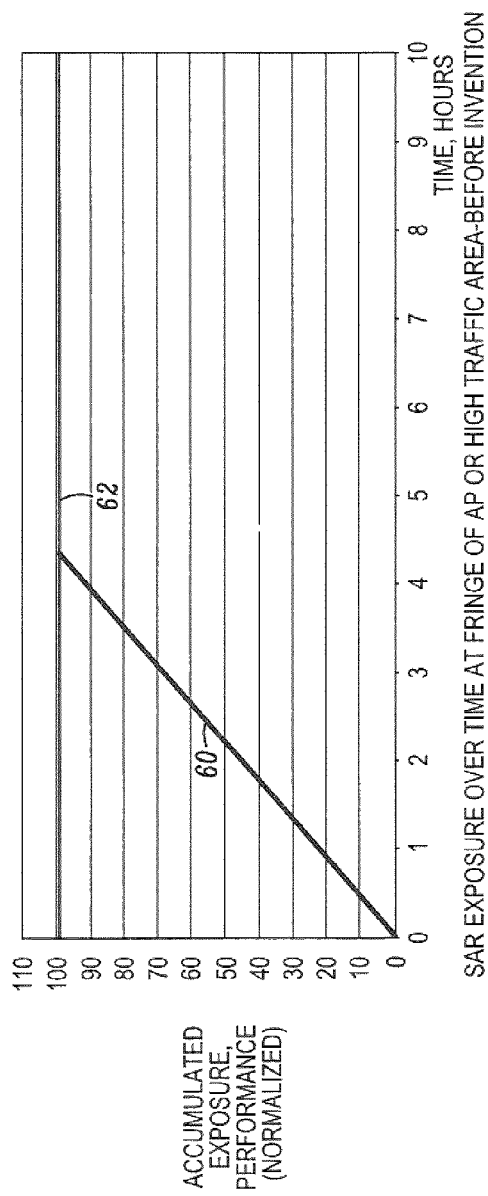
FIG. 5 shows a cumulative RF exposure that a user would be subjected to if a communications device remains in a fringe of access point coverage area or if there is heavy RF traffic in the area and is a worst case scenario which must be considered during the SAR evaluation.

FIG. 5 shows a graph 60 of a cumulative RF exposure a user would be subjected to if the device stays at a fringe of access point coverage area or if there is very heavy traffic in the area of the access point. Exposure increases linearly with time to achieve a performance curve 62 that is unchanged. This is a worst case scenario and exposes a subject to maximum radiation absorption and must be considered during a SAR evaluation.

In accordance with the disclosed system, RF power and a retry limit are permitted to increase until such time that the SAR calculated over time exceeds a predetermined limit or setting. The peak power and maximum retry limit is set to prevent excessive SAR and as one example the retry limit is set as high as ten retries but can be limited to less than this number. This reduces the performance only slightly due to the fact that performance drops quickly as operation moves towards the fringe area or high traffic areas, i.e. little performance is gained by greatly increasing the peak power and maximum retry limit.

Note: Implementation of the exemplary system does not decrease performance when either the device is not at a fringe area and not in high RF traffic area or cumulative RF exposure is not near the limit.

Figure 2:
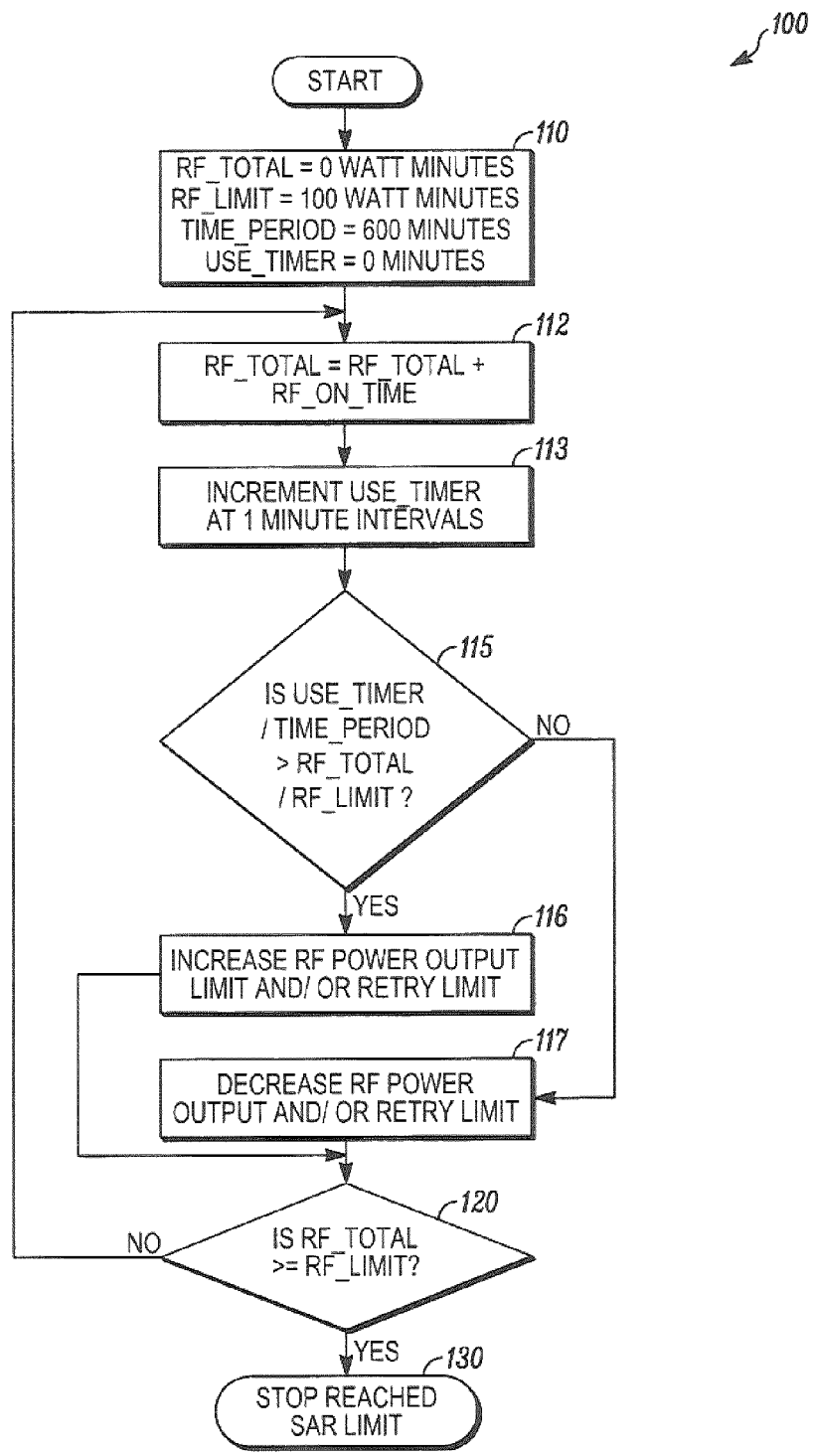
FIG. 2 is a flow chart of an exemplary system for limiting SAR exposure.

FIG. 2 is a flowchart 100 of the exemplary SAR control of a portable communications device. At a first step 110, a safety limit (or target absorption value) corresponding to rf absorption based on usage and power output of the communications device is initialized. In the exemplary system, the limit value is stored in controller memory and may be pre-stored during assembly of the device or may be entered via the user interface 24. At the step 110 the controller also establishes an initial or nominal retry and power rate for use during an initial time interval.

The controller 22 monitors rf power level and usage duration during a first monitoring time period. As one example, these variables can be updated each minute. After this monitoring period, the controller updates 112 a running measure of rf absorption (RF_TOTAL in the flowchart) based on a product of rf power times the usage time during the first monitoring time period and increments 113 a timer. The controller next determines 115 if the running measure of rf absorption is on schedule to exceed or be less than the safety limit. The result of this comparison causes the controller to adjust 116, 117 power and/or retry limit of the device during a subsequent time interval.

Greater insight is provided by description of a specific implementation. As depicted in the flowchart, one exemplary initialization step 110 sets a safety limit of 100 Watt Minutes, and initializes the running total of absorption to 0 Watt Minutes. A USE_TIMER value is initialized to 0 minutes and TIME_PERIOD variable to 600 minutes. During an initial period of say one minute the controller updates RF_TOTAL by adding the previous running rf absorption total to a quantity of the product of the power output level in watts times the time the transmitter was actually emitting if signals at that power level during the immediately previous one minute time interval.

The controller next updates 113 the USE_TIMER value and compares 115 a ratio of USE_TIMER to TIME_PERIOD with the ratio of RF_TOTAL to the RF_LIMIT. The controller adjusts power and/or retry limits during a next interval based on this comparison. A goal of the system is to maximize performance while assuring the absorption limits are not exceeded. This is done by extrapolating past results over the TIME_PERIOD of 600 minutes. A ratio is established between the present time period in minutes with the TIME_PERIOD of 600 minutes and this ratio is compared with the ratio of running absorption divided by the limit value of 100 Watt minutes.

If the first ratio is less than the absorption ratio, the power and/or retry limit is increased and if the ratio is greater than or equal to the absorption ratio, the power and/or retry limit is decreased.

In accordance with an exemplary system, if the controller determines the rate of absorption needs to be diminished, one or both of power or retry limit are reduced. In the exemplary system both are scaled back by predetermined amount. This will result in a lower rate of absorption without unacceptable performance degradation. In a similar way, if the controller determines an ongoing absorption rate is too low (resulting in lower performance), both power and retry limits are increased.

After the power/retry rate adjustment, a determination 120 is made to see if the total absorption limit RF_LIMIT has been reached. If so the device 10 is powered down 130 after a warning message is conveyed to the user via the user interface 24.

Figure 6:
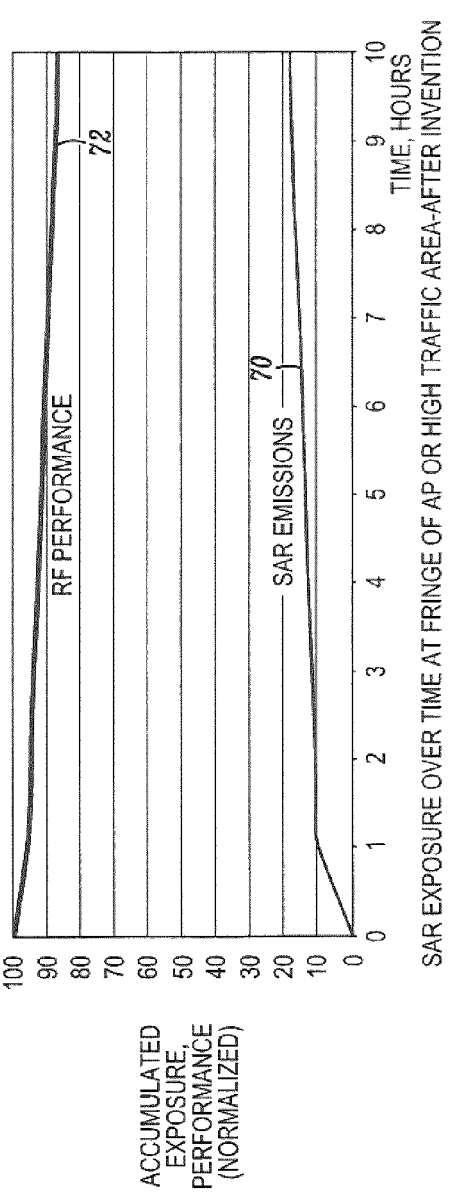
FIG. 6 graphically depicts beneficial effects through use of the disclosed system.

FIG. 6 is a graphical depiction of performance 72 and SAR emissions 70 achieved through use of the invention. The performance remains relatively constant at an acceptable level and the SAR also remains relatively constant within accepted limits either programmed into the device by the user or installed during fabrication.

The disclosed exemplary system has been described with a degree of particularity. It is the intent, however, that the invention include all modifications and alterations from the disclosed design falling within the spirit or scope of the appended claims.

The invention claimed is:

1. A method for controlling radio frequency (rf) energy emitted by a portable communications device comprising:

initiating communications with the portable communications device by sending and receiving communications packets between the portable communications device and a network access point at a first output power level and a first retry limit, wherein the first retry limit indicates a maximum permitted number of retries of packet transmission in the event of packet collisions;

updating an ongoing measure of emitted energy based on the first output power level multiplied by a total rf transmission time, adjusting the first retry limit based on the ongoing measure of emitted energy relative to a predetermined emissions limit; and continuing to periodically update said ongoing measure of emitted energy during operation of said communications device as the first retry limit is adjusted.

2. The method of claim 1 wherein the adjusting of the retry limit increases or decreases to achieve operation of the communications device at or near the predetermined emissions limit during a subsequent period of device operation.

3. The method of claim 1 wherein the predetermined emissions limit is determined by a user of the portable communications device.

4. The method of claim 1 wherein the adjusting further includes comparing a first ratio of operation time divided by a previous monitoring time with an absorption ratio of the running measure of rf emission divided by the emissions limit, wherein if the first ratio is less than the absorption ratio, the first retry limit is increased and if the ratio is greater than or equal to the absorption ratio, the first retry limit is decreased.

5. The method of claim 1 wherein the adjusting further includes adjusting the usage time of the communications device during a subsequent transmission period.

6. The method of claim 1 wherein the predetermined emissions limit is periodically reset.

7. A portable communications device comprising:

an rf transmitter and an antenna coupled to the rf transmitter for coupling the communications device to an access point; and a controller coupled to the rf transmitter to control a power and duration of message transmission by initializing an emissions limit corresponding to acceptable rf emission; tabulating rf power and usage during a first monitoring time period; updating a running measure of rf energy emission based on a product of the rf power and the usage time during the first monitoring time period; and using the running measure of rf energy emission relative to the emissions limit to adjust a transmission retry limit of the device during a subsequent time interval, wherein the transmission retry limit indicates a maximum permitted number of retries for the message transmission in an event of message collisions.

8. The portable communications device of claim 7 wherein the controller includes a memory for storing the emissions limit.

9. The portable communications device of claim 8 additionally comprising a user interface and wherein the emissions limit is adjustable by entering different values via the user interface.

10. The portable communications device of claim 9 wherein the controller determines whether the emission limit has been reached, whereupon the device is powered down after a warning message is conveyed to the user via the user interface.

11. The portable communications device of claim 7 wherein the controller compares a first ratio of operation time divided by a previous monitoring time with an absorption ratio of the running measure of rf emission divided by the emissions limit, wherein if the first ratio is less than the absorption ratio, the retry limit is increased and if the ratio is greater than or equal to the absorption ratio, the retry limit is decreased.

12. The portable communications device of claim 7 wherein the controller further compares a first ratio of operation time divided by a previous monitoring time with an absorption ratio of the running measure of rf emission divided by the emissions limit, wherein if the first ratio is less than the absorption ratio, the output power of the device is increased and if the ratio is greater than or equal to the absorption ratio, the output power of the device is decreased.

* * * * *